R. DECKER.
CORK-SCREWS.
No. 181,147. Patented Aug. 15, 1876.
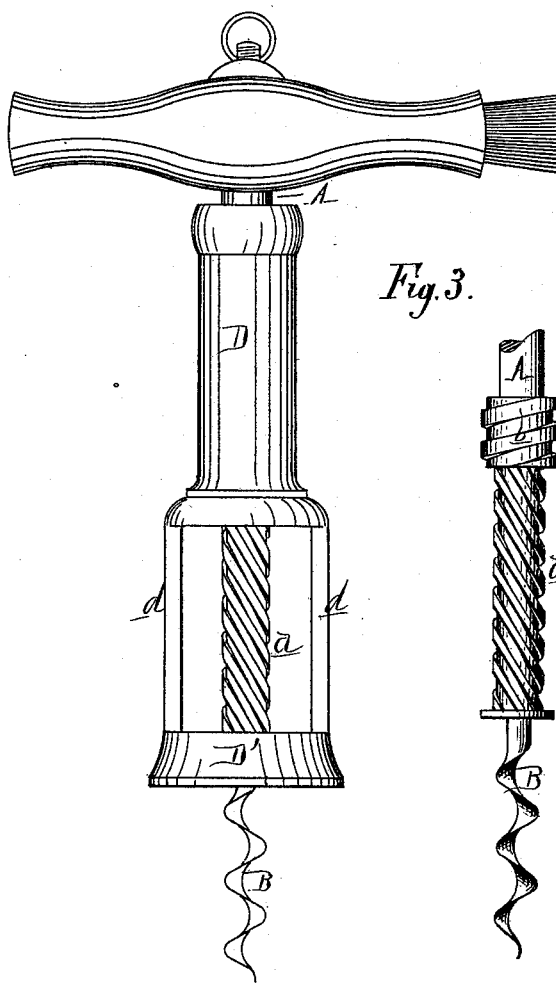
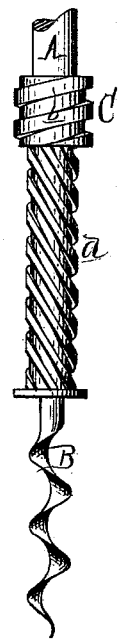
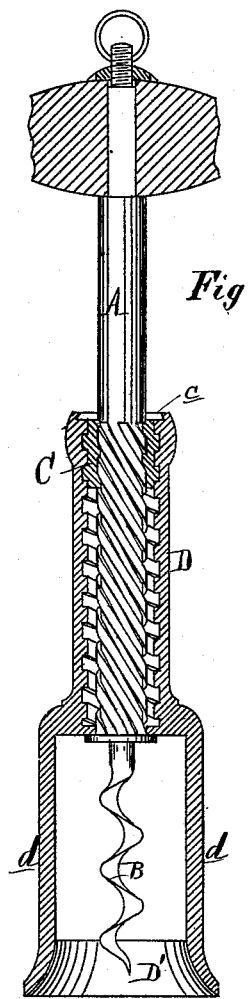
Attest.
L. R. Hulett.
Edward Barthel.
Inventor.
R. Decker
By Atty
Thos. S. Sprague

UNITED STATES PATENT OFFICE.

RUDOLPH DECKER, OF ZELLA ST. BLASSII, SAXE-COBURG-GOTHA, GERMANY, ASSIGNOR TO WILLIAM H. KLETT, OF ELGIN, ILLINOIS.

IMPROVEMENT IN CORKSCREWS.

Specification forming part of Letters Patent No. 181,147, dated August 15, 1876; application filed July 1, 1876.

*To all whom it may concern:*

Be it known that I, RUDOLPH DECKER, of the town of Zella St. Blassii, in the Duchy of Saxe-Coburg-Gotha and Empire of Germany, have invented an Improvement in Corkscrews, of which the following is a specification:

My invention relates to an improvement in corkscrews of that class wherein the screw is inserted in the cork and the latter is extracted from the bottle by a continuous rotation of the spindle in the same direction; and it consists in the peculiar construction and combination of the screw-spindle and nut with the hollow conical fulcrum, as more fully hereinafter set forth.

Figure 1 is an elevation, showing the position of the screw and spindle, as when the former is inserted in the cork preparatory to extracting it. Fig. 2 is a vertical section, showing the position of the parts preparatory to inserting the corkscrew. Fig. 3 is a detached view of the screw-spindle and its nut.

In the drawing, A represents a stem or spindle, terminating at the lower end in a corkscrew, B. The upper end has secured to it a lever-handle, in the usual manner.

The middle and lower part of the spindle has cut on it a five-threaded screw, $a$, left-handed, and of very steep pitch, on which runs a nut, C, Figs. 2 and 3, having a right-handed two-threaded screw, $b$, cut on its exterior, which nut runs in a similar thread cut in a cylinder, D, a shoulder in the lower end of which, and a stop-washer, $c$, in the top, preventing it from being run out. D' is a conical flange, which rests on the mouth of the bottle, and is connected with the cylinder by two arms, $d$, all being cast in one piece.

To use the device, it is first necessary to get the screw and nut in the proper position, which is done by turning the spindle to the left, which will cause the nut to run to the top of the cylinder. Then place the device on top of the bottle, the parts being in the position seen in Fig. 2, and turn the spindle to the right, which will cause the nut to run down to the lower end of the cylinder, the spindle advancing with it, and the screw entering the cork. When the nut is arrested by the shoulder at the lower end of the spindle, the left-hand thread $a$, being then operated, rapidly retracts the spindle and extracts the cork from the neck of the bottle, the cylinder and its conical flange serving as a fulcrum.

What I claim as my invention is—

In a cork-screw, substantially as described, the spindle A, provided with the left-hand screw-thread $a$ and nut C, having a right-hand screw-thread, $b$, cut on its exterior, in combination with the cylinder and flange D D', substantially as shown and set forth.

RUD. DECKER. [L. S.]

Witnesses:
H. J. WINSER,
THEODOR APEL.